(12) United States Patent
Qi et al.

(10) Patent No.: US 8,781,111 B2
(45) Date of Patent: Jul. 15, 2014

(54) SYSTEM AND METHODS FOR SIDE-CHANNEL ATTACK PREVENTION

(75) Inventors: Zheng Qi, San Jose, CA (US); Tao Long, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 1202 days.

(21) Appl. No.: 12/059,554

(22) Filed: Mar. 31, 2008

(65) Prior Publication Data

US 2009/0010424 A1 Jan. 8, 2009

Related U.S. Application Data

(60) Provisional application No. 60/929,597, filed on Jul. 5, 2007.

(51) Int. Cl.
*H04K 1/00* (2006.01)
*H04L 9/00* (2006.01)

(52) U.S. Cl.
USPC .............................. 380/28; 380/29; 380/255

(58) Field of Classification Search
None
See application file for complete search history.

(56) References Cited

U.S. PATENT DOCUMENTS

| | | | | |
|---|---|---|---|---|
| 6,804,782 B1* | 10/2004 | Qiu et al. | | 713/194 |
| 7,308,096 B2* | 12/2007 | Okeya et al. | | 380/28 |
| 7,500,112 B1* | 3/2009 | Wille et al. | | 713/194 |
| 7,848,515 B2* | 12/2010 | Dupaquis et al. | | 380/28 |
| 2002/0073316 A1* | 6/2002 | Collins et al. | | 713/174 |
| 2003/0084336 A1* | 5/2003 | Anderson et al. | | 713/200 |
| 2004/0105541 A1* | 6/2004 | Elbe et al. | | 380/28 |
| 2004/0143747 A1* | 7/2004 | Eckstein et al. | | 713/189 |
| 2004/0213407 A1* | 10/2004 | Fujita et al. | | 380/46 |
| 2006/0153372 A1* | 7/2006 | Kim et al. | | 380/30 |
| 2006/0256963 A1* | 11/2006 | Gebotys | | 380/205 |
| 2007/0053509 A1* | 3/2007 | Pezeshki et al. | | 380/28 |
| 2007/0076890 A1* | 4/2007 | Muresan et al. | | 380/287 |
| 2007/0180541 A1* | 8/2007 | Shu et al. | | 726/34 |
| 2008/0019503 A1* | 1/2008 | Dupaquis et al. | | 380/28 |
| 2008/0040607 A1* | 2/2008 | Kaabouch et al. | | 713/172 |
| 2009/0052657 A1* | 2/2009 | Golic | | 380/28 |
| 2009/0214025 A1* | 8/2009 | Golic | | 380/28 |

* cited by examiner

*Primary Examiner* — Cordelia Zecher
*Assistant Examiner* — Trang Doan
(74) *Attorney, Agent, or Firm* — Sterne, Kessler, Goldstein & Fox P.L.L.C.

(57) ABSTRACT

A side channel attack utilizes information gained from the physical implementation of a cryptosystem. Software and hardware-based systems and methods for preventing side channel attacks are presented. Cryptographic hardware may introduce dummy operations to compensate for conditional math operations in certain functions such as modular exponentiation. Cryptographic hardware may also introduce random stalls of the data path to introduce alterations in the power profile for the operation. A cryptographic function may be mapped to a micro code sequence having a plurality of instructions. Firmware in the cryptosystem may alter the micro code sequence by altering the order of instructions, add dummy operations in the micro code sequence, break the micro code sequence into multiple sub micro code sequences and/or change the register location for source and destination operands used in the sequence. These alterations are designed to randomly change the timing and power profile of the requested function.

19 Claims, 7 Drawing Sheets

SYSTEM AND METHODS FOR SIDE-CHANNEL ATTACK PREVENTION

CROSS REFERENCE TO RELATED APPLICATIONS

This application claims benefit of U.S. Provisional Application No. 60/929,597 entitled "Methods and Systems for Hardware Based Side-Channel Attack Prevention," file Jul. 5, 2007, which is incorporated by reference herein in its entirety.

FIELD OF THE INVENTION

The present invention relates generally to information security and specifically to cryptographic systems.

BACKGROUND OF THE INVENTION

Many applications and devices rely on embedded cryptosystems to provide security for an application and its associated data. These cryptosystems are often targets of individuals attempting to gain access to the applications or devices themselves or attempting to gather information being used by the application (e.g., credit card numbers, cryptographic keys, etc.). Early attacks on cryptosystems focused on the weaknesses of cryptographic algorithms. For example, in plaintext attacks, attackers feed known plaintext into a cryptosystem and analyze the generated ciphertext to gather information about the cryptographic algorithm being used.

As the industry developed countermeasures against these algorithm attacks, a different style of attacks emerged that focused on the physical implementation of the cryptosystem. Referred to as side channel attacks, these attacks attempt to derive sensitive information (e.g., cryptographic key) by monitoring physical characteristics of the cryptosystem such as timing information or power consumption by the system.

A timing attack measures the amount of time it takes for a cryptographic system to perform certain operations. These measurements may be analyzed to derive information about the secret keys used in the operations. For example, Diffie-Hellman and RSA operations consist of computing $R = y^x \bmod n$, where n is publicly available and y can be obtained (or even provided) by the attacker. The goal of a timing attack is to determine x or information that can lead to determining x, the secret key. Because the secret key remains constant, the attack varies the input y and monitors how long the cryptosystem takes to respond to y.

Power attacks monitor the power consumption (e.g., current draw) of the system while performing cryptographic operations. The amount of power consumed by a cryptosystem varies depending on the operations being performed. Additionally, an operation or sequence of operations may have a characteristic current or power profile. For example, power analysis may be used identify multiplication and squaring operations used in RSA and permutations and shifts used in DES, each of which have a known power signature. Thus, even a simple power attack can reveal the sequence of instructions being executed. Systems in which the execution path depends on the data being processed are particularly vulnerable to these types of attacks.

Differential power analysis (DPA) attacks are much more sophisticated and harder to prevent. These attacks combine the power measurements of basic power analysis attacks with statistical analysis to obtain information about secret keys being used in operations. In a DPA attack, a large number of test vectors (e.g., thousands of vectors) may be run through the cryptosystem. A statistical tool is then used to correlate potential values with the collected power consumption measurements. Algorithms utilizing modular exponentiation operations are particularly vulnerable to DPA attacks.

What is therefore needed are systems and methods for preventing these sophistical forms of side-channel attacks.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
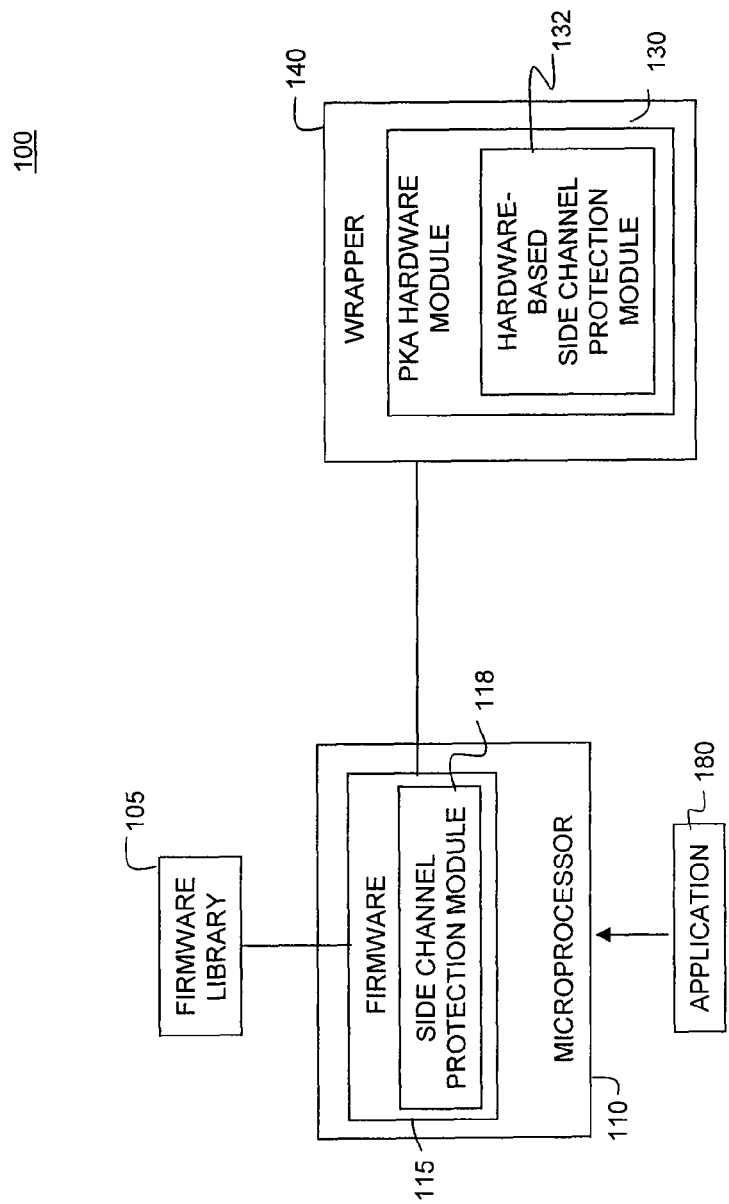
FIG. 1 depicts a block diagram of an exemplary scalable cryptography accelerator engine (PKA), according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Structural Embodiments

FIG. 1 depicts a block diagram of an exemplary scalable cryptography accelerator engine (PKA) 100, according to embodiments of the present invention. PKA engine 100 uses a layered approach based on the collaboration of firmware and hardware to perform a specific cryptographic operation. This firmware/hardware (FW/HW) collaboration approach provides increased flexibility for different types of applications requiring cryptographic processing.

In PKA engine 100, the public key cryptographic operations are broken down into multiple layers. The higher layer non-computation intensive operations are implemented in firmware. The lower layer computation intensive operations are implemented in hardware. Additionally, a portion of the firmware is configured to prepare a micro code instruction sequence to be carried out by the hardware. In an embodiment, this portion of the firmware is dedicated to the function of generating the required micro code instruction sequences.

PKA engine 100 includes a microprocessor 110 coupled to PKA hardware module 130 via a connection 120. In an embodiment, connection 120 is a bus. Firmware 115 runs on target microprocessor 110. PKA engine 100 also includes a platform independent firmware library 105. Platform independent firmware library 105 may be targeted to a generic microprocessor or microcontroller for handling top level sequencing.

In general, firmware 115 decomposes a cryptographic function (e.g., RSA) into a sequence of operations. Firmware 115 is configured to schedule the performance of the sequence of operations by PKA hardware module, by software, or by a combination of both hardware and software. For example, firmware 115 may decompose RSA encryption into a series of exponentiation operations followed by a modular multiplications and modular additions. By using micro code sequences generated in firmware to direct hardware operations, sophisticated counters to side channel attacks can be implemented.

Firmware 115 may include a side channel protection module 118. Side channel protection module 118 is configured to introduce randomness into the micro code sequence generated by the firmware. As described above, firmware 115 is configured to develop a micro code sequence for a requested cryptographic operation. The micro code sequence determines the nature of the computation to be performed as well as an order of the computational steps to be carried out by the hardware. Side channel protection module 118 may introduce randomness into the micro code sequence by a variety of techniques. For example, side channel protection module 118 may re-order instructions in a random sequence, may add dummy operations to a sequence in a random manner, may break a sequence into multiple mini sequences to change the communication pattern between the hardware and software, and/or may change register locations of source operands and/or target operands. The use of one or more of these techniques makes the prediction of hardware behavior extremely difficult.

In an embodiment, data transfers between microprocessor (or host processor) 110 and PKA module 130 are handled through a memory-mapped input/output (IO) and possibly a DMA controller. In an alternate embodiment, the PKA hardware module interfaces with the coprocessor bus of a specific microprocessor. In this embodiment, data transfer between the firmware and hardware is more efficient than memory-mapped IO embodiment. However, this embodiment makes the firmware and hardware platform dependent and limits the ability of connecting the hardware to a DMA or another hardware module.

PKA hardware module 130 provides a hardware core that supports basic computationally intensive operations. PKA hardware module 130 is described in further detail in FIG. 3, below. Wrapper 140 provides an interface for the PKA hardware module 130 to bridge into different architectures. Wrapper may support multiple IO interfaces (e.g., a register access interface and/or a streaming interface). In an embodiment, microprocessor 110 and PKA hardware module 130 are on the same chip. In alternative embodiments, microprocessor 110 is on a separate chip from PKA module 130.

PKA hardware module 130 includes a hardware-based side channel protection module 132. Hardware-based side channel protection module 132 is configured to perform hardware based techniques for preventing side channel attacks. For example, hardware-based side channel protection module 132 is configured to convert unconditional operations to conditional operations and/or to introduce random stalls during operation of the hardware. These hardware operations are described in further detail in Section 2.

Application 180 is an application that requires a cryptographic operation such as a public key cryptography function.

A public key cryptographic function is typically deconstructed into a specific public key operation such as elliptical curve, Diffie-Hellman, and RSA. These operations are handled by firmware 115.

Figure 2:
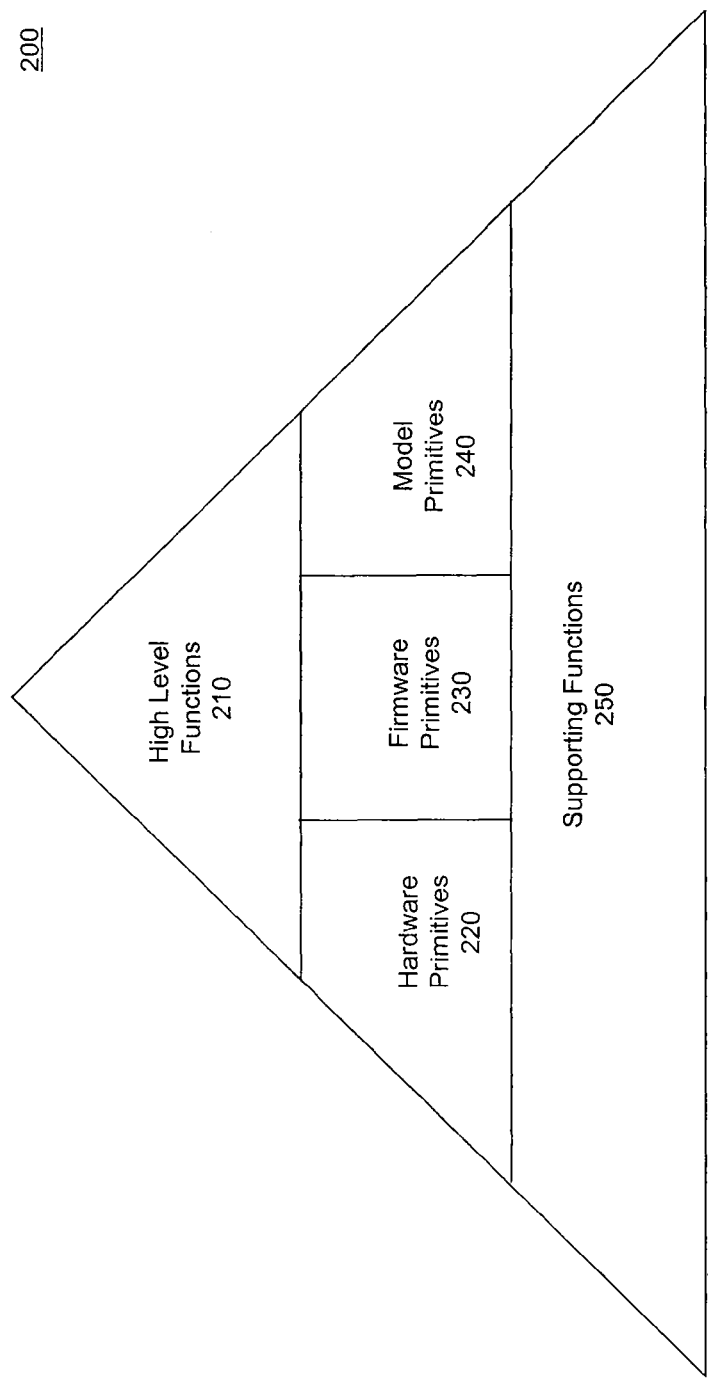
FIG. 2 depicts a logical organization of firmware, according to embodiments of the present invention.

FIG. 2 depicts a logical organization 200 of firmware 115, according to embodiments of the present invention. Firmware 115 decomposes a higher level cryptographic function into individual steps and determines which agent (e.g., hardware or software) carries out each step.

High level functions 210 are top level application programming interface (API) compiled to implement the high level public key operations such as Diffie-Hellman, DSA, RSA, Elliptical Curve Diffie-Hellman (ECDH), or Elliptical Curve DSA (ECDSA). These high level functions are further decomposed by other components of the firmware to carry out the necessary operations. For example, Diffie-Hellman, DSA, and RSA may be completely mapped to hardware and ECDH and ECDSA are partially mapped to hardware. Therefore, DH, DSA, and RSA can be represented by single micro-code sequences that are prepared and sent to hardware in one operation. Whereas, ECDH and ECDSA are represented by multiple micro code sequences that are sent to hardware in a software loop.

Hardware primitives 220 are routines that perform the hardware calls to implement the primitive functions. The hardware primitive 220 is configured to decompose a higher level function to specific operation and to drive PKA hardware module 130 to carry out the decomposed operations. The hardware primitives are firmware code that generate the microcode sequences sent to hardware module 130 for computation.

Firmware primitives 230 are performance-optimized firmware routines intended for software implementation or for performance comparison. These routines may be coded with platform dependent assembly language to handle CARRY propagation or SIMD which are hard to deal with using high level programming languages like C.

Model primitives 240 are optional. When present, model primitives 240 provide a mechanism to model math operations using off-the-shelf proven libraries such as GMP and OpenSSL/Crypto libraries. When present, model primitives 330 allow for rapid prototyping and modeling.

Supporting functions 250 performs low level functions such as memory management functions or error reporting functions. The code at this level does not have knowledge of math functions firmware is trying to implement.

Figure 3:
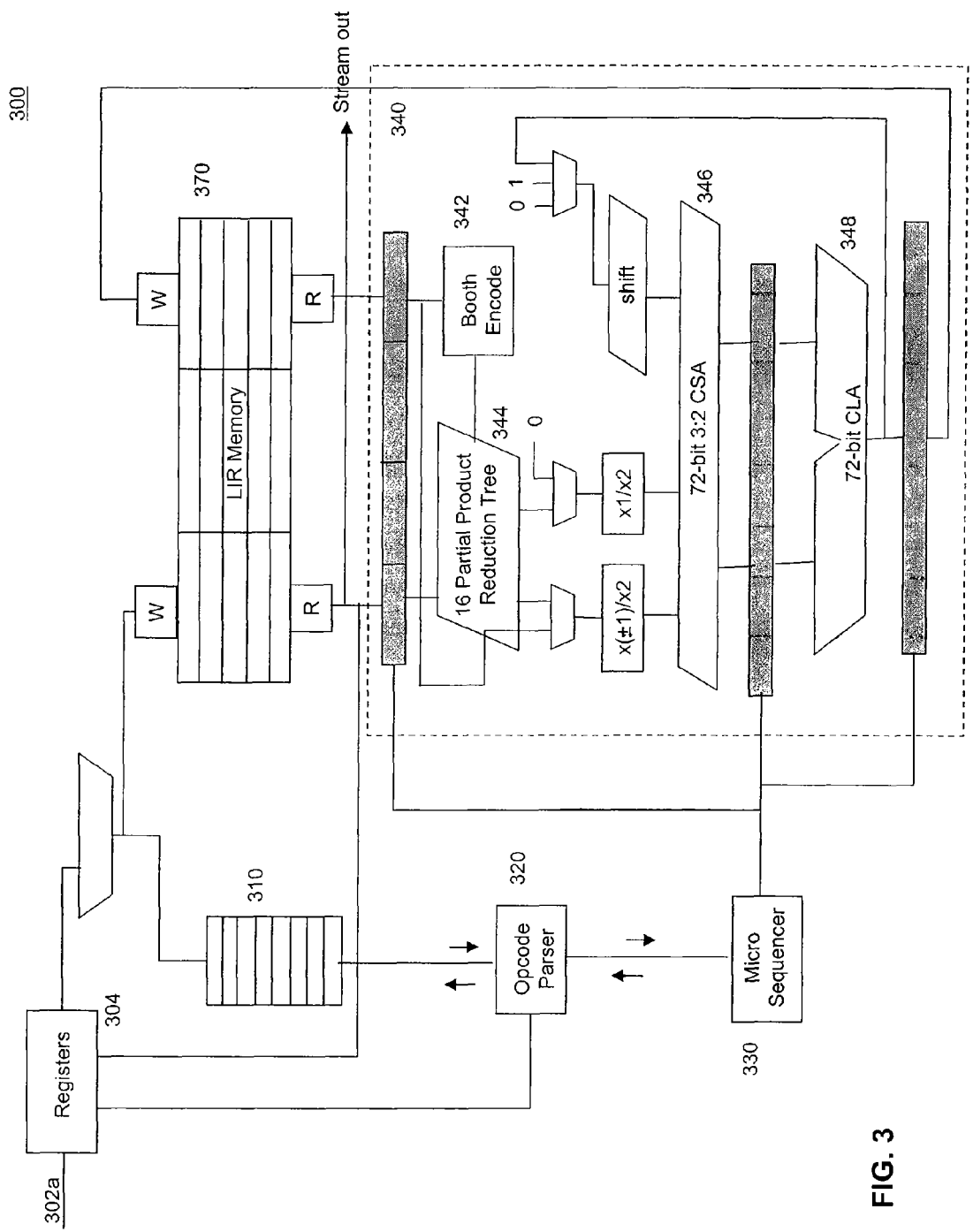
FIG. 3 depicts a block diagram of an exemplary public key accelerator (PKA) hardware module, according to embodiments of the invention.

FIG. 3 depicts a block diagram of an exemplary public key accelerator (PKA) hardware module 300, according to embodiments of the invention. Previous public key cryptographic hardware engines have a very simple command interface. In these engines, each public key operation is defined by a single command with a designated opcode. These hardware engines process one command at a time. The command output must be read back before a new command can be issued by the host processor. Additionally, each command is independent from other commands.

In PKA hardware module 300, each command represents a microcode sequence that allows multiple primitive operations to be mixed. The length of the command is limited by the internal memory size of the PKA module and the size of the operands embedded in the command sequence.

The PKA microcodes can be divided into two general categories: data transfer microcodes and data processing microcodes. A data transfer microcode transfers data from a host processor to the LIRs or reads the value of a LIR back to the host processor. Example data transfer opcodes include "move to" opcodes (e.g., MTLIR, MTLIRI) that move data to a LIR, "move from" opcodes (e.g, MFLIR, MFLIRI) that move data from a LIR, a "clear" opcode (e.g., CLIR) that clears a LIR, and a SLIR that sets a LIR value to a small immediate value. The data transfer opcodes may be represented by a single 32-bit instruction followed by an optional immediate operand.

A data processing microcode performs data processing using the internal registers. In an embodiment, data processing microcodes are two 32-bit instructions that can carry up to five operands per instruction. Typically, the data processing opcodes do not have associated immediate operands in the microcode sequence.

An opcode is specified in the most significant octet of an instruction. The most significant bit (MSB) of the opcode indicates whether additional opcodes remain in the command sequence. For example, the MSB is set to indicate that the opcode is the last opcode of the command sequence. Module 300 uses this bit to perform housekeeping tasks such as de-allocating LIRs or clearing memory. The remaining seven bits of the most significant octet is encoded with the opcode.

The instruction also includes a destination operand. In an embodiment, the first operand following the opcode is the destination operand. The destination operand may be a 12-bit operand. For data transfer opcodes, the last operand is an immediate operand that contains the size of the data operand embedded or the size of the operation. In an embodiment, PKA module 200 may track the size of data stored in LIR 370 for performance optimization. The size of data in the last operand is specified in a number of octets. For data processing opcodes, the next four operands are source operands. In an embodiment, the first three operands are 12-bit operands and the last operand is an 8-bit operand.

PKA module 300 includes one or more Input/Output (IO) interfaces 302. A host processor (not shown) communicates a command sequence to PKA module 300 via an IO interface 302. For example, microprocessor 110 may communicate a prepared microcode sequence to PKA module 300. If the PKA module 300 includes multiple IO interfaces, the host processor communicates the command sequence via one of the IO interfaces. Multiple IO interfaces are typically not used concurrently.

PKA module 300 may include a register access interface 302a. Register access interface 302a is coupled to a register block 304. Register block 304 includes a set of registers from which a host processor can read or write. Register access interface 302a may write a sequence of operations to perform into the opcode FIFO queue 310. The register access interface 302a may also initialize data in large integer register (LIR) memory 370.

A host processor may request a command to be sent through register access interface 302a. In an embodiment, the host processor may write a field (e.g., PKA_LOCK) to an access control register (not shown) to request a resource lock and to monitor the "locked" status. The PKA hardware grants the host access if the streaming interface 302b is idle. The host then owns the PKA hardware unless the host explicitly releases the lock by clearing the "locked" status. If the host is the only entity accessing the PKA module 300, the lock can be set once when the system in initiated (e.g., at boot-up). A host may send a command sequence to PKA module 300 by writing the sequence to a DATA_IN register in register block 304 one command word at a time. When the host is transferring data to the PKA memory, the target register must be free.

PKA module 300 may also include a streaming interface 302b. Streaming interface 302b is used to stream a command into PKA module 300 and stream out the result after the command has completed. Streaming interface 302b is typically used with a DMA controller (not shown).

Although FIG. 3 depicts PKA module 300 as having both a register access interface 302a and a streaming interface 302b, a module 300 may include only one of these IO interfaces.

Large Integer Register (LIR) memory 370 is coupled to register block 304, streaming interface 302b, and datapath 340. Although LIR 370 is referred to as a register, in an embodiment, LIR 370 is implemented with a memory. In an embodiment, the internal memory of PKA 300 is mapped to a special set of large integer registers (LIRs) that can be indexed in the microcode. This mapping allows the reuse of data that is already in the PKA memory and avoids unnecessary data loading and unloading. A microcode command such as described above may include a register operand. A host processor sources data to LIR 370 and pulls data from LIR memory (e.g., through register access interface 302a) using these register operands. In an embodiment, the LIR registers used by cryptographic operations can be re-ordered and re-named. The re-ordering and re-naming of LIR registers complicates the analysis of local memory access patterns by attackers.

Opcode FIFO queue 310 holds the sequence of opcodes received via one of the IO interfaces 302. Opcode FIFO queue may store all the opcodes except for certain immediate opcodes such as "move to" opcodes. In an embodiment, opcode FIFO queue 310 implemented with a dual-ported memory.

Opcode parser 320 is coupled to opcode FIFO queue 310, register block 304, and micro sequencer 330. Opcode parser 320 is configured to control the flow of the opcode sequence from opcode FIFO queue 310. The opcode parser reads one opcode from opcode FIFO queue 310 at a time. The opcode parser 320 checks the incoming opcode stream for the immediate opcodes (e.g., the "move to" opcodes) and stores the immediate data in the command to LIR memory. As described above, these immediate opcodes are not placed into the opcode queue 310. The opcode parser 320 also controls the queuing of the remaining opcodes and schedules opcode dispatch to micro sequencer 330. That is, the opcode parser 320 interprets the requested operation and passes the operation to the micro sequencer 330. Upon completion of the opcode, opcode parser 320 retires the opcode from queue 310. The opcode parser also controls the return of data to the host.

Micro Sequencer 330 is coupled to opcode parser 320 and data path block 340. In an embodiment, micro sequencer 330 is a finite state machine that controls the execution of a single opcode. The micro sequencer 330 controls operand fetch, pipeline operation, and result write back. The micro sequencer 330 controls memory access of the data path 340 to LIR memory 370 and coordinates computational units within the data path 340. The micro sequencer 330 generates a control signal to the data path 340.

Data path 340 includes one or more math computational units. Data path 340 may include a Booth encode module 342, a 16 partial produce reduction tree 344, a carry-save adder (CSA) 346, and a carry look-ahead (CLA) adder 348. As would be appreciated by persons of skill in the art, data path 340 may include additional or alternative units, as required by a specific application.

In addition to timing and power analysis attacks, some side-channel attacks focus on monitoring memory activity such as cache misses. As discussed above, PKA hardware module 300 includes local memory for storing operands and data. An attacker cannot observe the internal memory operations of the PKA hardware module because the PKA hardware module memory is isolated from the system memory. Furthermore, as discussed above, the LIR registers used by the operations may be re-ordered and re-named. These architectures and techniques add a further level of protection against side-channel attacks which rely on the analysis of local memory access patterns.

2. Methods for Hardware Based Side-Channel Attack Prevention

PKA engine 100 supports a multi-level approach for the prevention of side-channel attacks. The following section describes methods for prevention of timing and power analysis attacks.

2.1 Hardware Based Methods 2.1.1 Unconditional Operation Processing

Certain cryptographic computations such as modular exponentiation include conditional math operations. In many cryptographic implementations, these conditional math operations are not performed. Thus, the amount of time required to do a math operation is a function of both the input size and the input value. This timing dependency on the input value provides an attacker with critical information.

Modular exponentiation is susceptible to such timing attacks. Modular exponentiation is the predominant computation in public key algorithms. Modular exponentiation is typically done through iterations of modular multiplications based on the value of the exponent. A conventional approach for modulo exponentiation $M^e$ (mod n) is to perform a binary scan of the exponent and raise the power of the base repeatedly, accumulatively multiplying the number when the corresponding exponent bit is a '1.' Thus, when the current bit in the exponent is '1,' a modular multiplication is performed. If the current bit in the exponent is '0,' a modular multiplication is not required. An attacker can therefore derive the number of ones in the exponent by monitoring how long a modular exponentiation lasts and also by how much power is consumed by the cryptosystem during the operation.

Figure 4:
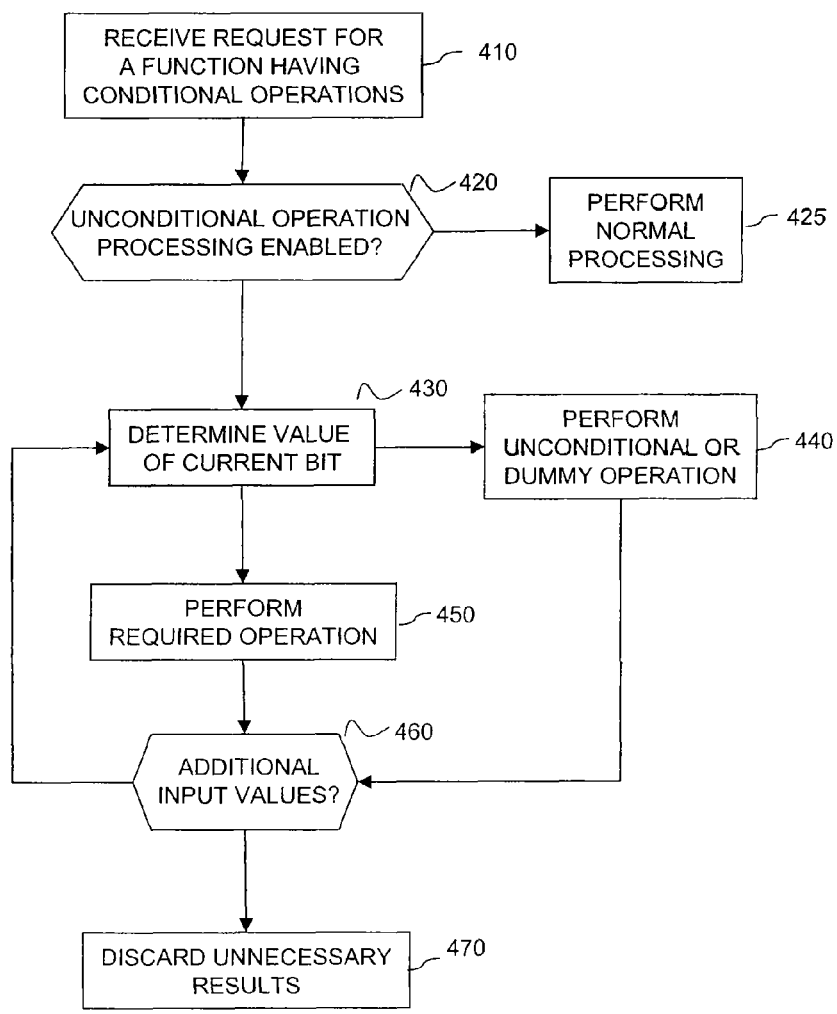
FIG. 4 depicts a flowchart of a method for preventing side channel attacks in computations having conditional math operations, according to embodiments of the present invention.

FIG. 4 depicts a flowchart 400 of a method for preventing side channel attacks in computations having conditional math operations, according to embodiments of the present invention. In the method of flowchart 400, one or more conditional math operations are converted into unconditional math operations (e.g., by performing similar, dummy operations). Flowchart 400 is described in the context of modular exponentiation. As would be appreciated by persons of skill in the art, flowchart 400 may be used in other math operations, in a set of math operations, or in all math operations.

In step 410, a request for a cryptographic function having conditional math operations is received. For example, the PKA engine may receive a request requiring modular exponentiation.

In step 420, a determination is made whether unconditional operation processing is enabled. In an embodiment, unconditional operation processing may be enabled or disabled on a system level, an application level, or on an operation-by-operation basis. For example, depending on the application, a user may opt to have increased system performance at the risk of vulnerability to timing side channel attacks. In this situation, the user would not enable unconditional operation processing for the application. If unconditional operation processing is enabled, operation proceeds to step 430. If unconditional operation processing is not enabled, operation proceeds to step 425. When unconditional operation processing is enabled, the computation (e.g., modular exponentiation) may take approximately 33% longer.

In step 425, normal processing is performed.

In step 430, the value of the current bit in the input is determined. If the input bit value is '0,' operation proceeds to step 440. If the input bit value is '1,' operation proceeds to step 450.

In step 440, an unconditional operation (or dummy operation) is performed. For example, in modular exponentiation, the modular multiplication is performed. In alternate embodiments, a dummy operation, similar to a modular multiplication, may be performed. Operation then proceeds to step 460.

In step 450, the required operation is performed.

In step 460, a determination is made whether additional input values remain to be processed. If additional input values remain, operation returns to step 430. If no additional input values remain, operation proceeds to step 470.

In step 470, any unnecessary results are discarded. For example, the result write-back to LIR memory may be conditioned on the value of the current bit in the exponent.

The method of flowchart 400 increases the difficulty of timing attacks because the amount of time required to perform a math operation is only a function of the input size and is no longer tied to the value of the input. Power profiling is also made more difficult as the computation becomes regular.

2.1.2 Random Stall

Another level of protection against side-channel attacks introduces random stalls into computational activities. In this protection technique, random gaps are inserted between any two operations to randomize the timing delay or power profile. Alternatively, a random stall can be introduced to force the data path to remain idle during an operation such as modular exponentiation or modular addition. By introducing a random delay, an attacker cannot accurately predict when an operation starts or ends or derive any information from the power profile (e.g., current draw). The random stall technique is opcode independent.

Figure 5:
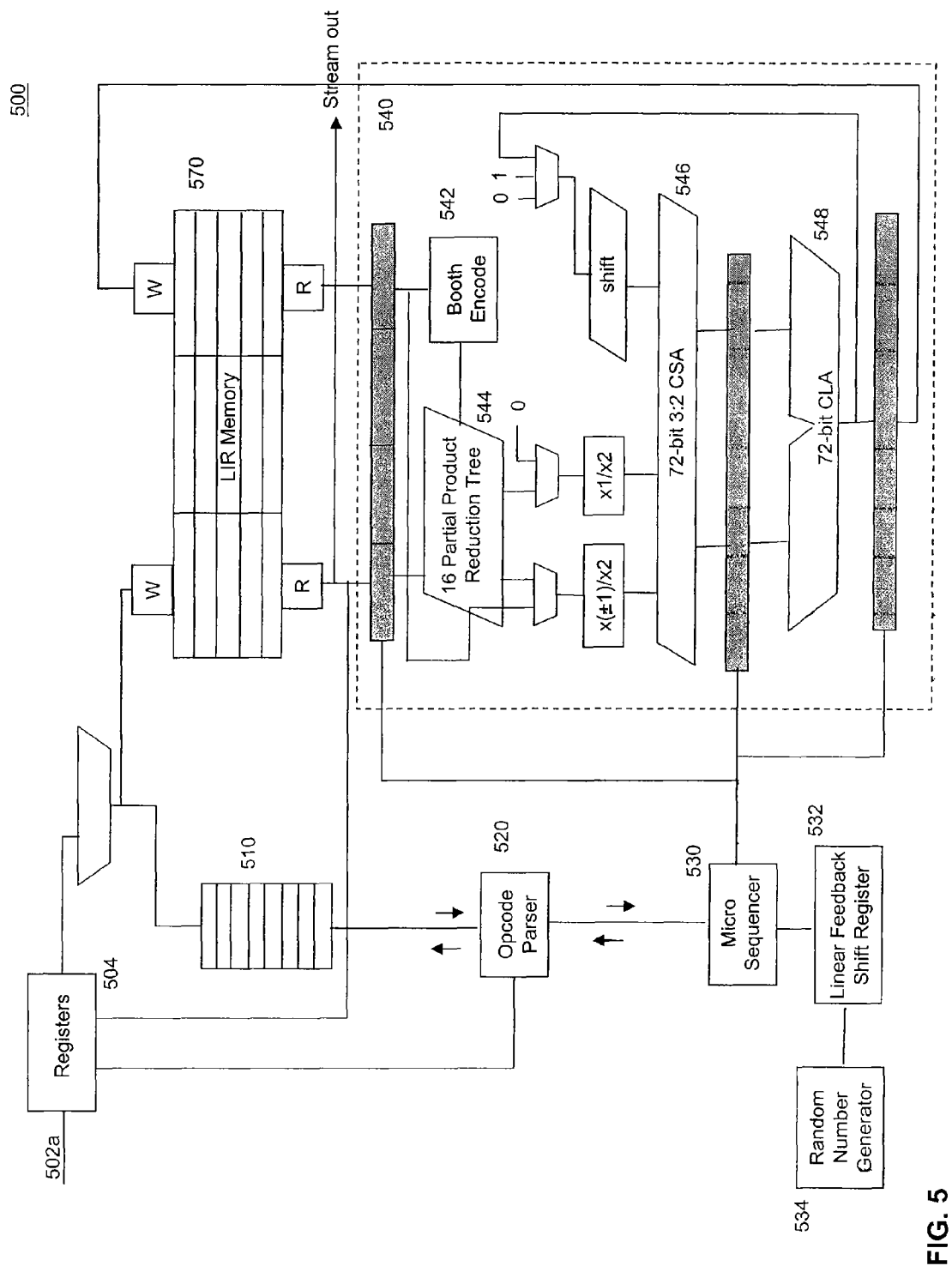
FIG. 5 depicts an exemplary system for prevention of side-channel attacks using randomized stall patterns, according to embodiments of the present invention.

FIG. 5 depicts an exemplary system 500 for prevention of side-channel attacks using randomized stall patterns, according to embodiments of the present invention. System 500 includes the elements of PKA hardware module 300 described above in reference to FIG. 3.

In the embodiment depicted in FIG. 5, micro sequencer 530 is coupled to linear feedback shift register 532. Linear feedback shift register 532 generates a pseudo-random or very close to random stall pattern. In an embodiment, linear feedback shift register 532 is free running in every clock cycle. Micro sequencer 530 receives the randomized stall pattern from linear feedback shift register 530 via input 531. Alternatively, micro sequencer 530 is coupled to the random number generator. The output of the random number generator can then be used as the stall pattern. The received stall pattern is then used by micro sequencer 530 to stall data path 540.

Linear feedback shift register 532 is also coupled to a random number generator 534. Random number generator 534 provides an initial seed value to linear feedback shift register 532. A new seed value is generated each time linear feedback shift register 532 is called. Random number generator 534 may be a true hardware-based non-deterministic random number generator. In an embodiment, random number generator 534 utilizes free running oscillators to capture thermal noise as the source of randomness.

Figure 6:
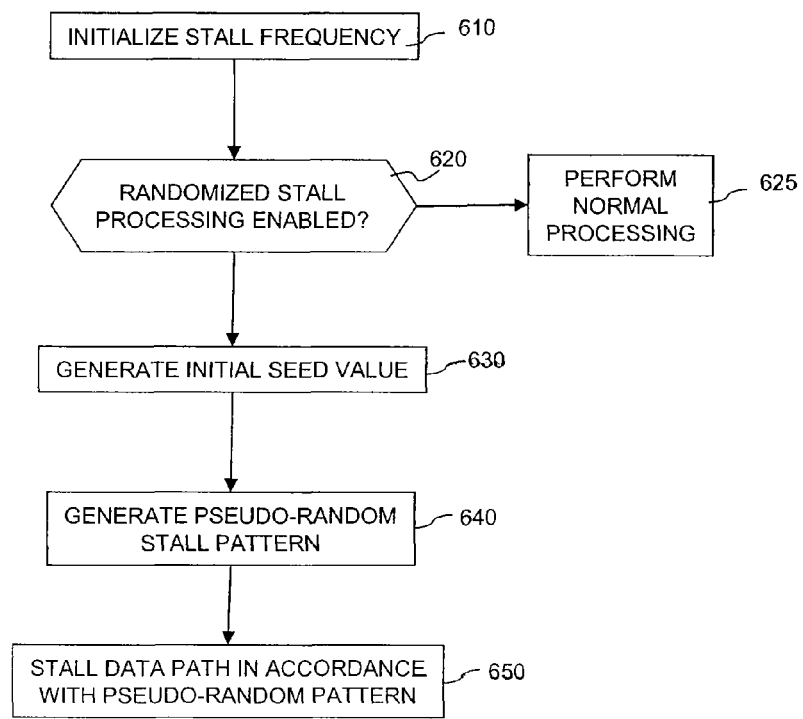
FIG. 6 depicts a flowchart of a method for side-channel attack prevention using a randomized stall pattern, according to embodiments of the present invention.

FIG. 6 depicts a flowchart 600 of a method for side-channel attack prevention using a randomized stall pattern, according to embodiments of the present invention. FIG. 6 is described with continued reference to the system described in FIG. 5. However, flowchart 600 is not limited to that embodiment. Note that some of the steps of flowchart 600 do not necessarily have to occur in the order shown.

In step 610, the stall frequency for the system is initialized. This step is optional. In an embodiment, the stall frequency may be configurable by a user. The system may provide multiple stall frequencies up until a maximum value (e.g., 50%) for a user to select. As frequency of stall decreases, the security of the system against side-channel attacks is also increased. For example, as a default, the data path may be stalled 50% of the time. While maximizing security, this stall frequency reduces the performance of the cryptosystem by a factor of 2. A user may not want to sacrifice that level of performance. Instead, a user may opt to reduce the stall frequency to a lower level (e.g., to 25%). A user may alternatively disable this feature.

In an embodiment, the stall frequency may be set on an operation by operation basis. For example, a higher level of security may be set for a Diffie-Hellman operation (e.g., 50% stall frequency) whereas a lower level of security may be set for an RSA operation (e.g., 10% stall frequency). The randomized stall feature may also be enabled or disabled on an operation by operation basis.

In step 620, a determination is made whether the randomized stall processing is enabled. If randomized stall processing is not enabled, operation proceeds to step 625. If randomized stall processing is enabled, operation proceeds to step 630.

In step 630, an initial seed value is generated. Note that step 630 can occur any time prior to a high level API function being called. In an embodiment, the firmware seeds linear feedback shift register 532 from random number generator 534. The seed value may be XORed with the internal value of the linear feedback shift register 532.

In step 640, a pseudo-random stall pattern is generated by linear feedback shift register 532 and provided to micro sequencer 530. In an embodiment, the pseudo-random stall pattern is generated from a 64-bit linear feedback shift register of the polynomial $(x^{64}+x^4+x^3+x+1)$.

In step 650, the data path is stalled according to the received pseudo-random stall pattern. Random stalls may be implemented via idling the data path, freezing the data path pipeline, or by clock gating. The circuits in the data path typically run off the same clock. In an embodiment, the data path is stalled by disabling the clock for the data path. When the clock is disabled, the data path stops operating. In an alternate embodiment, the micro sequencer can withhold input data form the data path.

The random stall process is also effective against DPA attacks. As discussed above, in a DPA attack, the attacker relies upon the correlation of a large number of samples to derive a secret key. The random nature of the stall process prevents an attacker from collecting correlating samples.

2.2 Software-Based Methods

Figure 7:
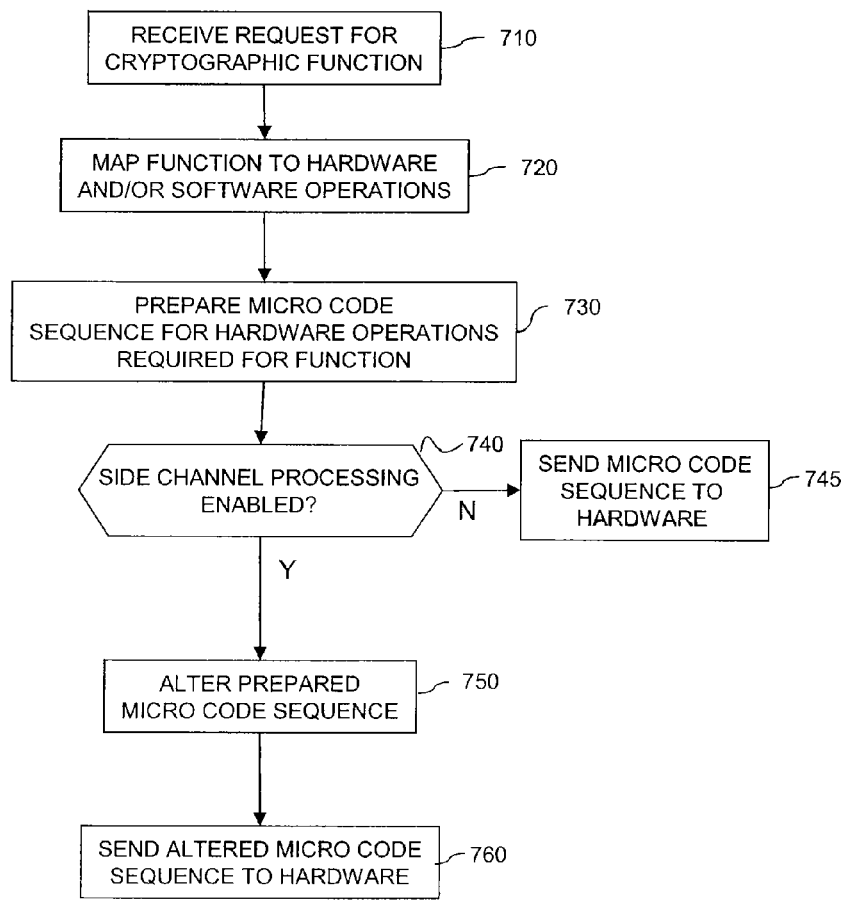
FIG. 7 depicts a flowchart of a method for side-channel attack prevention using a software randomization of hardware micro code command sequence, according to embodiments of the present invention.

FIG. 7 depicts a flowchart 700 of a method for side-channel attack prevention using a software randomization of hardware micro code command sequence, according to embodiments of the present invention. FIG. 7 is described with continued reference to the system described in FIG. 1. However, flowchart 700 is not limited to that embodiment. Note that some of the steps of flowchart 700 do not necessarily have to occur in the order shown.

In step 710, a request for a cryptographic operation is received by firmware 115. For example, firmware 115 may receive a request for a Diffie-Hellman, DSA, RSA, elliptical curve Diffie-Hellman (ECDH), or elliptical curve DSA (ECDSA) function.

In step 720, the requested function is mapped to hardware and/or software operations. For example, Diffie-Hellman, DSA and RSA are mapped completely to hardware and ECDH and ECDSA are partially mapped to hardware.

In step 730, firmware 115 prepares a micro code sequence for the hardware operations required to process the requested function.

In step 740, a determination is made whether software-based side channel protection is enabled. In an embodiment, software-based side channel protection may be enabled or disabled on a system level, an application level, or on an operation-by-operation basis. For example, depending on the application, a user may opt to have increased system performance at the risk of vulnerability to timing side channel attacks. In this situation, the user would not enable unconditional operation processing for the application. If software-based side channel protection processing is enabled, operation proceeds to step 750. If software-based side channel protection processing is not enabled, operation proceeds to step 745.

In step 745, the prepared micro code sequence is sent to PKA hardware module 130.

In step 750, side channel protection module 118 alters the prepared micro code sequence. A variety of techniques may be used to alter the micro code sequence. For example, the order of instruction in the micro code sequence may be changed. Side channel protection module 118 may also add dummy operations into the sequence in a random or pseudo random manner. Side channel protection module 118 may also break a micro code sequence into multiple mini sequences to change the communication pattern between the software and hardware. In a further example, the LIR register locations used for the source and destination operands may be changed. Side channel protection module 118 may use one or more of these techniques, depending upon the level of security desired. These techniques alone or in combination make the prediction of hardware behavior extremely difficult for an attacker.

In step 760, the altered micro code sequence is sent to PKA hardware module 130.

3. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A hardware-based method for preventing side channel attacks, comprising:

receiving, in a cryptographic processor, a request for a cryptographic function;

decomposing, in the cryptographic processor, the requested cryptographic function into a sequence of hardware operations, wherein the sequence of hardware operations includes an optional mathematical operation and a required mathematical operation;

replacing each optional mathematical operation in the sequence of hardware operations with a dummy operation;

performing, in a cryptographic hardware module, the dummy operation for each optional mathematical operation and the required mathematical operation for each required mathematical operation in the sequence of hardware operations; and generating an output for the cryptographic function, wherein the output is based on the required mathematical operation in the sequence of hardware operations.

2. The method of claim 1, wherein the cryptographic function includes a modular exponentiation.

3. The method of claim 2, wherein performing the dummy operation comprises;

performing the dummy operation when the value of a bit in an exponent of an input of the modular exponentiation is zero.

4. The method of claim 1, further comprising:
discarding results of the dummy operation.

5. A hardware-based method for preventing side channel attacks, comprising:

receiving a request to perform a cryptographic operation;

generating an initial seed value in a random number generator;

combining the initial seed value with a value of a linear feedback shift register to generate, in a cryptographic hardware module, a pseudo-random stall pattern;

performing the cryptographic operation using a data path in the cryptographic hardware module;

stalling, by the cryptographic hardware module, execution of the data path in accordance with the pseudo-random stall pattern; and outputting the result of the cryptographic operation.

6. The method of claim 5, wherein stalling execution of the data path comprises:

stalling a data path pipeline by stopping a clock.

7. The method of claim 5, wherein stalling execution of the data path comprises:

disabling a clock associated with the data path.

8. The method of claim 5, wherein stalling execution of the data path comprises:

delaying input of data into the data path.

9. The method of claim 5, wherein stalling execution of the data path comprises:

stalling a data path pipeline by stopping data path logic.

10. The method of claim 5, wherein generating an initial seed value comprises:

generating the initial seed value using thermal noise of an oscillator.

11. The method of claim 5, further comprising:
generating a random number in a random number generator; and using the random number as the pseudo-random stall pattern.

12. The method of claim 5, further comprising:
initializing a frequency for the pseudo-random stall pattern.

13. The method of claim 12, further comprising:
receiving a user-selected value for the frequency of the pseudo-random stall pattern.

14. The method of claim 5, wherein generating the pseudo-random stall pattern comprises:

generating the pseudo-random stall pattern in the linear feedback shift register.

15. A software-based method for preventing side channel attacks, comprising:

receiving, in a cryptographic processor, a request for a cryptographic function;

Parsing the cryptographic function into a data transfer micro code sequence and a data processing micro code sequence:

mapping, in the cryptographic processor, the parsed cryptographic function into hardware operations;

preparing, in the cryptographic processor, the data processing micro code sequence to direct operations of a hardware module, wherein the prepared data processing micro code sequence has a plurality of instructions;

generating a plurality of sub micro code sequences to alter a communication pattern with the hardware module, wherein the plurality of sub micro code sequences perform the same function as the prepared data processing micro code sequence; and sending the plurality of sub micro code sequences to the hardware module.

16. The method of claim 15, further comprising:
mapping a memory in the hardware module into a plurality of register addresses.

17. The method of claim 16, wherein the prepared data processing micro code sequence includes a source address mapped to a first register address in the memory of the
hardware module and a destination address mapped to a second register address in the memory of the hardware module.

18. The method of claim 17, further comprising:
changing a register location associated with the first register address and a register location associated with the second register address.

19. The method of claim 15, further comprising:
storing data of the data transfer micro code sequence in a memory.

* * * * *